United States Patent Office 2,978,448
Patented Apr. 4, 1961

2,978,448
BENZO-1,3-THIAZINE-DIONE-(2,4) AND METHODS OF MAKING THE SAME

Klaus Hasspacher, Biberach (Riss), Germany, assignor to Dr. Karl Thomae G.m.b.H., Biberach (Riss), Germany, a corporation of Germany No Drawing. Filed Oct. 16, 1958, Ser. No. 767,522
Claims priority, application Germany Oct. 24, 1957
11 Claims. (Cl. 260—243)

This invention relates to a new, previously unknown class of compounds, namely benzo-1,3-thiazine-dione-(2,4) [Beilstein nomenclature: 2,4-dioxo-dihydro-5,6-benzo-1,3-thiazine] and its derivatives having the general structural formula

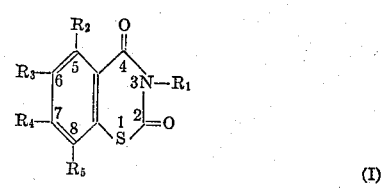

wherein $R_1$ is hydrogen, hydroxyl, alkyl, alkenyl, alkinyl, substituted alkyl, aralkyl, aryl, substituted aryl, a heterocyclic radical, amino or substituted amino and $R_2$, $R_3$, $R_4$, and $R_5$ may be hydrogen or any desired substituent, such as halogen, alkyl, aryl, aralkyl, alkoxy, nitro or dialkylamino, and various methods of preparing these compounds.

The present invention provides relatively simple methods for the synthesis of the benzo-1,3-thiazine-dione-(2,4) nucleus, some of which make it possible to produce compounds having the above-indicated Formula I by a single-phase reaction, without isolation of intermediate products and under mild reaction conditions.

Quite generally, these compounds can be produced, according to the present invention, by starting with an aromatic o-mercapto-carboxylic acid, transforming the same into a mixed anhydride in an anhydrous, inert solvent in the presence of a tertiary amine, which may also serve as the inert solvent if desired, simultaneously replacing the hydrogen atom of the mercapto group by a carbalkoxy, carbaralkoxy or carbaryloxy group, provided the starting material is not already an o-mercapto-carboxylic acid with a correspondingly substituted mercapto group, and then reacting the resulting product with a primary amine of the formula $H_2NR_1$, wherein $R_1$ has the meaning defined in Formula I.

METHOD A

In accordance with one embodiment of the present invention, an aromatic o-mercapto-carboxylic acid is reacted with a chloroformic acid ester in an anhydrous, inert solvent in the presence of a tertiary amine, which may also serve as the inert solvent if desired, and then with a compound of the formula $H_2NR_1$.

The reaction proceeds in accordance with the following equation:

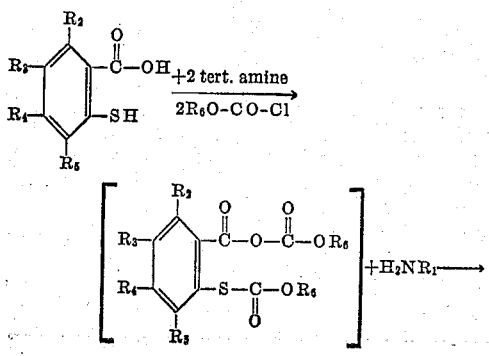

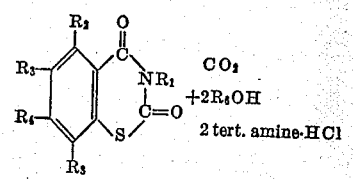

wherein $R_1$ to $R_5$ have the meaning defined in Formula I above, and $R_6$ is an alkyl, aralkyl or aryl radical.

This reaction yields the desired compound immediately, in pure form and with good yields, accompanied by the formation of 1 mol $CO_2$ and 2 mols of an alcohol $R_6OH$.

METHOD B

In accordance with another embodiment of the invention, the starting material is an aromatic o-mercapto-carboxylic acid wherein the hydrogen atom of the mercapto group is already replaced by the radical —$COOR_6$, which is first reacted with an acid chloride or a chloroformic acid ester $R_7COCl$, and then with a compound having the formula $H_2NR_1$ in an inert, anhydrous solvent in the presence of a tertiary amine, which may also serve as the inert solvent if desired.

This reaction proceeds according to the following formula:

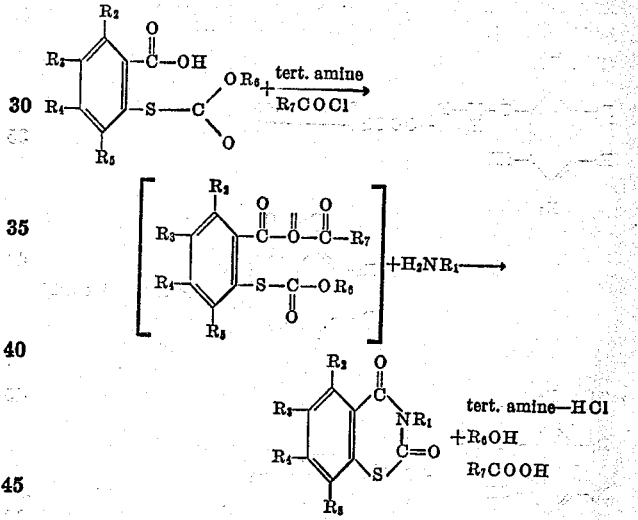

wherein $R_1$ to $R_6$ have the above-indicated meaning and $R_7$ is an alkyl, aralkyl, aryl, alkoxy, aralkoxy or acyloxy radical.

In Methods A and B the inert solvent may be tetrahydrofuran, dioxan, chloroform, methylene chloride, benzene toluene, dimethyl-formamide or also the tertiary amine used in the reaction. Suitable tertiary amines are triethylamine, tributylamine, N-ethyl-piperdine, pyridine, and the like. In Method A, 2 mols of the tertiary amine are used, whereas in Method B only one mol of the tertiary amine is advantageously used.

In Method A, 2 mols of the chloroformic acid ester are used, whereas in Method B one mol of an acid chloride or of a chloroformic acid ester are used. At least one mol of the compound having the formula $H_2NR_1$ is used in both methods.

Under the conditions of Methods A and B the ring closure already takes place in the cold. The reaction components are advantageously admixed with each other at a temperature of between —10 and +100° C. The compound having the formula $H_2NR_1$ is advantageously added 5–20 minutes after the chloroformic acid ester or the acid chloride has been added. Thereafter, the reaction mixture is kept at room temperature for from 30 minutes to several hours in order to allow the reaction to go to completion.

In addition, the compounds having the general formula I above may be produced by suitable alteration of processes described in the prior art [see U.S. Patent 2,476,559, issued July 19, 1949; A. Einhorn, J. Schmidlin, Berichte 35, page 3653 (1902); A. Eihorn, C. Mettler, Berichte 35, page 3647 (1902); A. Einhorn, V. Bagh, Berichte 43, page 334; (1902) Bogisch, Chemisches Zentralblatt 13, page 1078, Dissertation Rostock (1889)].

METHOD C

In accordance with still another method of the present invention, amides of aromatic o-mercapto-carboxylic acids of the general formula

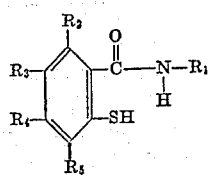

wherein $R_1$ to $R_5$ have the meaning defined above in connection with Formula I, and which may be produced in accordance with well-known methods, are reacted with phosgene, a chloroformic acid ester of the formula $R_6OCOCl$ or a carbonic acid ester of the formula $(R_6O)_2$—CO, $R_6$ having the meaning defined in connection with Methods A and B above, in an inert, anhydrous solvent and in the presence of a tertiary amine, which may simultaneously serve as the inert solvent, in accordance with the following reaction equations (1) 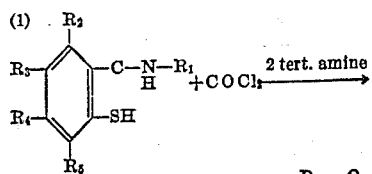

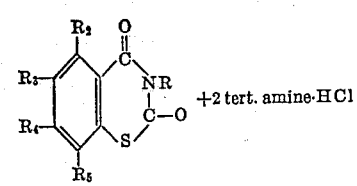

(2) 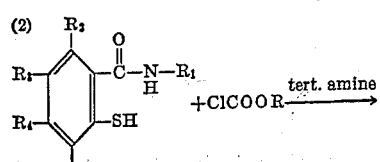

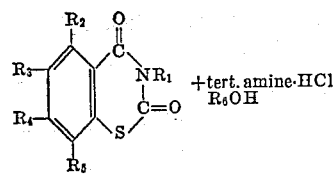

(3) 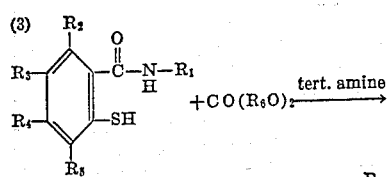

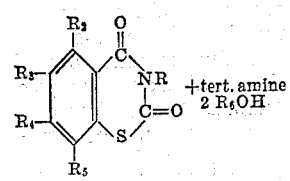

In reaction No. 3 the tertiary amine acts as a catalyst.

Suitable inert solvents and tertiary amines are the same as those mentioned under Methods A and B. The reaction components are advantageously employed in equimolar amounts, as indicated in reaction Equations 1 to 3 above. In reaction 3 the tertiary amine is preferably used in amounts between 0.5 and 1 mol. The reaction temperature in Equations 1 to 3 should be between 0 and 100° C., and the reaction period is between 2 and 10 hours.

METHOD D

In accordance with still another method, the starting material is an aromatic o-mercapto-carboxylic acid wherein, the mercapto hydrogen atom has been replaced by a carbalkoxy, carbaralkoxy or carbaryloxy radical, and which has the general structural formula

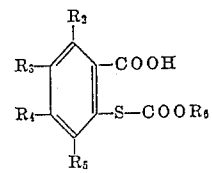

wherein $R_2$ through $R_6$ have the meaning previously defined. The starting compound is transformed in the corresponding acid halide in accordance with known methods, and the acid halide is subsequently reacted with a primary amine of the formula $H_2NR_1$, as previously defined, in an inert solvent and in the presence of a tertiary amine, which may also serve as the inert solvent if desired. This reaction sequence may be represented by the following equations:

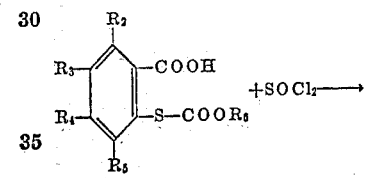

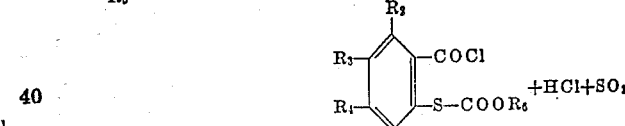

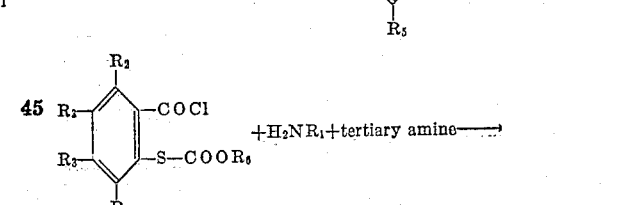

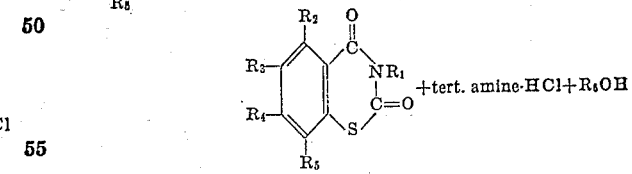

Suitable solvents and tertiary amines for this method are the same as those mentioned in connection with Methods A, B and C above. The reaction components are advantageously used in equimolar amounts, as indicated by the above reaction equations, at least 1 mol of the compound $H_2NR_1$ being employed.

The reaction temperature is preferably between 0 and 100° C., and the period of reaction is between 2 and 5 hours.

In those cases where compounds having the Formula I above are obtained in which $R_1$ represents hydrogen, i.e. in which the heterocyclic imino group is unsubstituted, alkyl, alkenyl alkinyl, substituted alkyl or aralkyl groups may be subsequently introduced into the molecule at the nitrogen atom. This substitution may be accomplished by methods customarily used for the introduction of such radicals at the nitrogen atom of heterocyclic rings. Most advantageously, the compound of the Formula I wherein $R_1$ is hydrogen is transformed into an alkali metal salt, for example the sodium salt, which is then reacted with a compound of the formula $R_1X$, wherein $R_1$ is alkyl, alkenyl, alkinyl, substituted alkyl or aralkyl and X is halogen, preferably chlorine or bromine.

For the purpose of tying up the hydrogen chloride liberated by any of these reactions, the tertiary amines may be replaced by inorganic bases, such as alkali metal hydroxides, alkali metal carbonates and alkali metal bicarbonates.

It is not absolutely essential that the reaction be carried out in an anhydrous solvent medium. Mixtures of water and organic solvents may also be used. Especially suitable for this purpose are organic solvents which are miscible with water, such as dioxan or tetrahydrofuran.

The compounds having the general formula

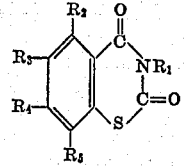

wherein $R_1$ is hydrogen, alkyl, alkenyl, alkinyl, substituted alkyl, aralkyl, aryl, substituted aryl or a heterocyclic radical, and radicals $R_2$, $R_3$, $R_4$ and $R_5$ have the meaning above defined, may also be produced by still other methods.

METHOD E

Another method, for example, comprises reacting a thiosalicyclic acid compound with cyanic acid, alkali metal cyanates, organic isocyanates or carbamic acid chlorides in water or in a suitable inert solvent to form intermediates of the Formula IIa and IIb below, which may then be readily cyclized into compounds of the Formula I above, either by heating or by the action of agents which effect the splitting off of water. These reactions sequences can be represented by the following equations (1)

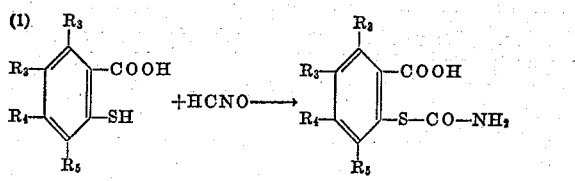

(2)

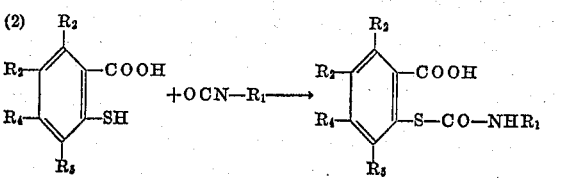

(3)

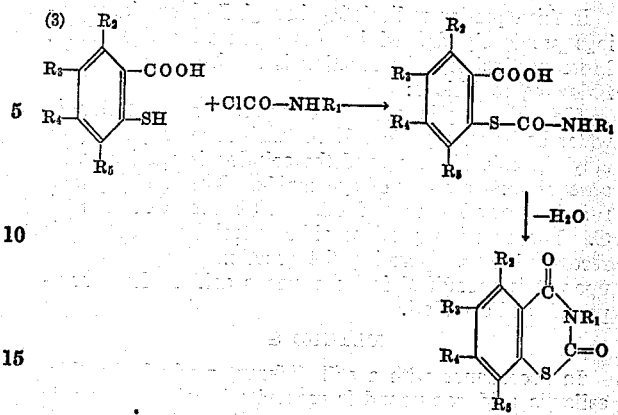

In these equations the radicals $R_1$ through $R_5$ have the meaning previously defined in connection with Formula I.* More particularly, reactions 1 to 3 are carried out under the following conditions:

(1) The thiosalicylic acid compound is suspended in an aqueous solution of cyanic acid or an alkali metal cyanate, such as potassium cyanate, and this suspension is heated to 20 to 100° C. until a clear solution is formed. By evaporating this solution, the compound of IIa or its alkali metal salt is obtained; by acidifying the clear solution, the alkali metal salts of compound IIa can be converted to compound IIa.

(2) The thiosalicylic acid compound is dissolved or suspended in an inert solvent, such as benzene, toluene, chloroform, ethylene chloride, dioxan, etc., admixed with the isocyanate and the mixture heated for 2 to 5 hours at 50–100° C. The reaction product crystallizes out or is recovered by evaporation.

(3) The thiosalicylic acid compound is dissolved in an inert solvent, such as benzene, toluene, chloroform, ethyl acetate, ethylene chloride, tetrahydrofuran, dioxan etc., expediently at a temperature of $-10$ to $+10°$ C., and preferably together with an equivalent weight of a tertiary organic amine base, such as triethylamine, tributylamine, N-ethyl-piperidine, dimethyl-aniline etc., or with an equivalent weight of an inorganic base, such as sodium hydroxide, potassium bicarbonate, soda etc., expediently dissolved in a little water, and the solution is then admixed with a carbamic acid chloride.

The reaction products IIa or IIb can be separated from the reaction side products with water.

The cyclization of compounds IIa or IIb may advantageously be effected as follows: Compounds IIa or IIb are either heated for 5 to 20 hours at 100 to 200° C.; or they are heated for 5 to 20 hours under reflux together with a pure high-boiling-point solvent, such as toluene, tetralin, decalin, etc.; or they are subjected to the action of an agent which effects the splitting off of water, such as thionyl chloride, phosphorus trichloride, phosphorus pentachloride or phosphorus oxychloride, for 1 to 10 hours at a temperature of 20 to 100° C.

METHOD F

In accordance with still another method, the thiosalicyclic acid is reacted with cyanamide to form compounds of the Formula III below, the imide group of which may readily be saponified into an oxo-group, for example by heating in aqueous acids. This reaction proceeds according to the following equation

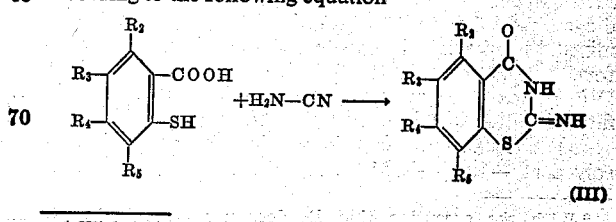

* With the exception that $R_1$ does not mean hydroxyl, amino and substituted amino.

In this equation radicals $R_2$ through $R_5$ have the meanings previously defined in connection with Formula I. More particularly, the reaction is carried out under the following conditions:

The thiosalicylic acid is dissolved or suspended in water or in an organic solvent, such as tetrahydrofuran, ethylene chloride, etc., and the solution is admixed with an equimolar amount of cyanamide. The resulting mixture is allowed to react for 2 to 10 hours at 50 to 100° C. The reaction product either precipitates out or is recovered by evaporating the reaction mixture, whereupon it is saponified in an aqueous acid to form compounds of Formula I.

METHOD G

In accordance with a still different method, the thiosalicylic acid compound is reacted with thiocyanic acid or alkali metal thiocyanates, mustard oils (isothiocyanic acid esters) or thiocarbamic acid chlorides to form intermediate compounds of the Formula IVa or IVb below. These reactions may be represented by the following equations:

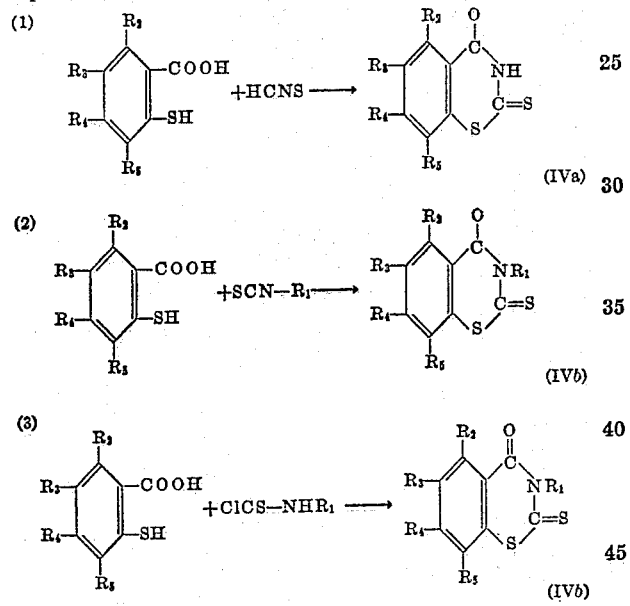

In these equations radicals $R_1$ through $R_5$ also have the meanings previously defined in connection with Formula I.* In intermediate compounds IVa and IVb the sulfur of the thione group can be readily replaced by oxygen in accordance with known methods for example, by heating the intermediate with mercuric oxide or lead oxide.

More particularly, reactions 1 to 3 above leading to intermediates IVa or IVb are advantageously carried out under the following conditions:

(1) The thiosalicylic acid starting compound is suspended in an aqueous solution of thiocyanic acid or of an alkali metal thiocyanate, such as potassium thiocyanate, and the suspension is heated for 5 to 30 hours at 50 to 120° C. The reaction product IVa is separated by vacuum filtration or evaporation.

(2) The thiosalicylic acid starting compound is dissolved or suspended in water or in an inert solvent, such as benzene, toluene, chloroform, ethylene chloride, dioxan etc., the resulting solution or suspension is admixed with the isothiocyanate and the mixture is heated for 2 to 5 hours at 50 to 100° C. The reaction product IVb either crystallizes out of the reaction mixture and is filtered off, or it is isolated by evaporation.

(3) The thiosalicylic acid starting compound is dissolved at −10 to +15° C. in an inert solvent, such as ---
* With the exception that $R_1$ does not mean hydroxyl, amino and substituted amino.

benzene, toluene, chloroform, ethylene chloride, dioxan, ethyl acetate, tetrahydrofuran, etc., and the solution is admixed with an equivalent amount of a tertiary organic amino base, such as triethylamine, tributyl-amine, N-ethyl-piperidine, diethyl-aniline, etc., or with an equivalent amount of an inorganic base, such as sodium hydroxide, potassium bicarbonate, soda, etc., preferably dissolved in a little water, and the mixture is then brought together with a thiocarbamic acid chloride. The reaction mixture is first allowed to react for 1 to 3 hours at 0 to 20° C. and then for 2 to 5 hours at 50 to 100° C. The reaction product IVb may readily be separated from the side products with the aid of water.

For the purpose of replacing the sulfur with oxygen in intermediates IVa or IVb, the intermediates are heated with 1 to 10 equivalent weights of mercuric oxide or lead oxide for 1 to 5 hours at 150 to 250° C. The final reaction product having the Formula I is then extracted with a solvent, such as methanol, ethanol, dioxan, etc.

The benzo-1,3-thiazine-diones-(2,4) disclosed herein and produced in accordance with the methods described above possess valuable pharmaceutical properties, such as excellent antipyretic, bacteriostatic and fungistatic activity.

The following examples will further illustrate the present invention and will enable others skilled in the art to understand it more completely. It is understood, however, that the invention is not limited to the particular compounds and methods illustrated in these examples.

EXAMPLE 1

*Benzo-1,3-thiazine-dione-(2,4)*

30 gm. thiosalicyclic acid, together with 39 gm. triethylamine, were dissolved in 125 ml. tetrahydrofuran at −5° C., and the resulting solution was slowly admixed with 42 gm. chloroformic acid ethyl ester. After allowing the mixture to stand for 15 minutes, 50 ml. of a semi-concentrated aqueous ammonia solution were added and the mixture was again allowed to stand over night at room temperature. Thereafter, the tetrahydrofuran solvent was removed from the mixture by vacuum distillation. The residue was suspended in water and the suspension was acidified with a mineral acid and filtered on a vacuum filter. The filter cake was washed with water and methanol and then recrystallized from ethanol. The purified product had the structural formula

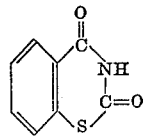

and a melting point of 211° C. The yield was 21 gm. Calculated: N 7.82%. Found: N 7.80%.

EXAMPLE 2

*Benzo-1,3-thiazine-dione-(2,4)*

10 gm. S-carbomethoxy-thiosalicylic acid were dissolved in 50 ml. tetrahydrofuran. The resulting solution was cooled to 0° C. and was then admixed with 4.8 gm. triethylamine and 5.1 gm. chloroformic acid ethyl ester. After allowing this mixture to stand for 10 minutes, 10 ml. of a semi-concentrated aqueous solution were added thereto and the resulting mixture was again allowed to stand for 5 hours at room temperature. The reaction mixture was finally worked up as described in Example 1 and yielded 5.6 gm. of benzo-1,3-thiazine-dione-(2,4).

EXAMPLE 3

*3-amino-benzo-1,3-thiazine-dione-(2,4)*

A solution of 15 gm. thiosalicylic acid in 70 ml. dioxan was admixed with 20 gm. triethylamine and 21 gm. chloroformic acid ethyl ester at −5° C. After allowing this mixture to stand for 15 minutes, 6.5 ml.

of 80% hydrazinehydrate were added thereto. The reaction mixture was then heated for 5 hours at 50° C. Upon cooling, a precipitate was formed which was separated and recrystallized from acetone. The purified product had the structural formula

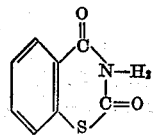

and a melting point of 202° C. The yield was 6.5 gm.
Calculated: N 14.45%. Found: N 14.40%.

EXAMPLE 4

3-methyl-benzo-1,3-thiazine-dione-(2,4)

30 gm. thiosalicylic acid were dissolved in 100 ml. tetrahydrofuran and the resulting solution was admixed with 72 gm. tributylamine. The resulting mixture was then cooled to 0° C. and 47.5 gm. chloroformic acid isopropyl ester were added thereto. After allowing the mixture to stand for a short period of time, 20 ml. of a 35% aqueous methylamine solution were added thereto. The reaction mixture was allowed to stand over night at room temperature in a closed container and was finally worked up as described in Example 1. The product had the structural formula

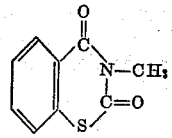

and a melting point of 121° C. The yield was 19 gm.
Calculated: N 7.25%. Found: N 7.02%.

EXAMPLE 5

3-phenyl-benzo-1,3-thiazine-dione-(2,4)

30. gm. thiosalicylic acid together with 72 gm. tributylamine, were dissolved in 100 ml. chloroform at 0° C., and the resulting solution was admixed with 36.7 gm. chloroformic acid methyl ester. After allowing this mixture to stand for 10 minutes, 18.2 gm. aniline, dissolved in 20 ml. chloroform, were added thereto. The reaction mixture was then allowed to stand for 10 hours at room temperature. The chloroform was distilled off, leaving behind an oil which solidified upon being treated with water and diluted hydrochloric acid. The solid product was recrystallized from methanol. The crystalline product had the structural formula

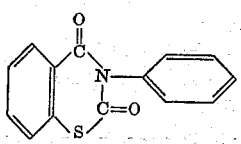

and a melting point of 146° C. The yield was 12 gm.
Calculated: N 5.50%. Found: N 5.72%.

EXAMPLE 6

3-p-methoxyphenyl-benzo-1,3-thiazine-dione-(2,4)

20 gm. thiosalicylic acid were dissolved in 100 ml. pyridine at 0° C. and the resulting solution was admixed with 28 gm. chloroformic acid ethyl ester. The resulting mixture was allowed to stand for 15 minutes whereupon 16 gm. p-anisidine, dissolved in 30 ml. pyridine, were added thereto. The reaction mixture was heated for 5 hours at 40 to 50° C., poured into 500 ml. water and finally weakly acidified. The oil which separated out solidified when placed into a refrigerator. It was recrystallized from dioxan. The crystalline reaction product had the structural formula

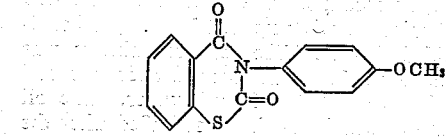

and a melting point of 212° C. The yield was 14 gm.
Calculated: N 4.91%. Found: N 4.85%.

EXAMPLE 7

Benzo-1,3-thiazine-dione-(2,4)

25 gm. thiosalicylic acid amide were finely powdered and suspended in 200 ml. pyridine at 0° C. Thereafter, while stirring a solution of 18 gm. phosgene in toluene, was added to the suspension, whereby the thiosalicylic acid amide dissolved and the mixture heated up. The mixture was then heated for a few hours on a water bath and was finally poured into 1 liter water. An oil separated out which partially solidified. The solid substance was recrystallized from ethyl acetate. The yield was 6 gm. benzo-1,3-thiazine-dione-(2,4) having a melting point of 210° C.

EXAMPLE 8

3-p-chlorophenyl-benzo-1,3-thiazine-dione-(2,4)

20 gm. thiosalicylic acid-p-chloroanilide were dissolved in 200 ml. pyridine. 12.4 gm. chloroformic acid ethyl ester were then added to the solution and the mixture was heated for 3 hours on a boiling water bath. The solution was then poured into 2 liters water, whereby a crystalline substance separated out after a short period of time. The crystalline product was recrystallized from dioxan. The yield was 14 gm. of a compound having the structural formula

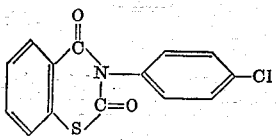

and a melting point of 187° C.
Calculated: N 4.84%. Found: N 4.70%.

EXAMPLE 9

3-benzyl-benzo-1,3-thiazine-dione-(2,4)

30 gm. carboethoxy thiosalicylic acid were finely powdered and 50 gm. thionylchloride were poured over it. The mixture was then heated under reflux until no more gas was evolved. The excess thionylchloride was then removed by vacuum distillation and the residue was dissolved in benzene. This solution was admixed with a solution of 15 gm. triethylamine and 14 gm. benzylamine in benzene, accompanied by cooling. After the principle reaction had gone to completion, the reaction mixture was heated for 2 additional hours on a water bath. At the end of this time the benzene solvent was distilled off in a vacuum. The oily residue was extracted with water and was recrystallized from ethanol. The purified product had the structural formula

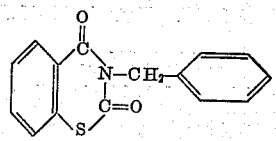

and a melting point of 103° C. The yield was 8 gm.
Calculated: N 5.21%. Found: N 5.45%.

EXAMPLE 10

3-cyclohexyl-benzo-1,3-thiazine-dione-(2,4)

20 gm. thiosalicylic acid were dissolved in a mixture of 50 ml. tetrahydrofuran and 50 ml. pyridine at —5° C. Thereafter, 28 gm. chloroformic acid ethyl ester were slowly added to the solution. The mixture was allowed to stand for 10 minutes, whereupon, 13 gm. cyclohexylamine were added thereto. The reaction mixture was allowed to stand for 2 hours at room temperature and was subsequently poured into 500 ml. water. The oil which separated out was isolated. It solidified after the volatile side products had been driven off by distillation. It was recrystallized from methanol. The purified product had the structural formula

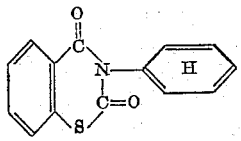

and a melting point of 148° C. The yield was 8.5 gm.
Calculated: N 5.36%. Found: N 5.65%.

EXAMPLE 11

*3-p-diethylaminophenyl-benzo-1,3-thiazine-dione-(2,4)*

20 gm. thiosalicyclic acid and 36 ml. triethylamine were dissolved in 100 ml. tetrahydrofuran at 0° C. The resulting solution was then slowly admixed, first, with 25 ml. chloroformic acid ethyl ester and then with 17.7 gm. p-diethylamino-aniline. After allowing the mixture to stand for 2 hours the solvent was driven off by vacuum distillation. The residue was washed with water and was recrystallized from a mixture of dioxan and water. The purified reaction product had the structural formula

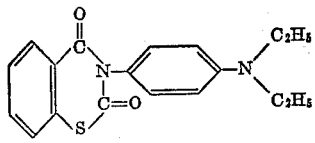

and a melting point of 214° C. The yield was 16 gm.
Calculated: N 8.59%. Found: N 8.48%.

EXAMPLE 12

*3-p-nitrophenylamino-benzo-1,3-thiazine-dione-(2,4)*

20 gm. thiosalicylic acid and 36 ml. triethylamine were dissolved in 100 ml. dioxan at 0° C., and the resulting solution was successively, slowly admixed, first, with 25 ml. cholorformic acid ethyl ester and then with 20 gm. p-nitrophenyl hydrazine. The reaction mixture was allowed to stand for 3 hours whereupon the solvent was removed by vacuum ditsillation. The residue was washed with water and was recrystallized from methanol. The recrystallized product had the structural formula

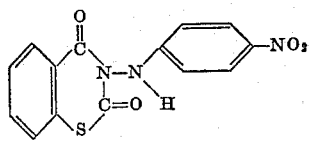

and a melting point of 197° C. The yield was 11 gm.
Calculated: N 13.30%. Found: N 13.52%.

EXAMPLE 13

*3-isopropyl-benzo-1,3-thiazine-dione-(2,4)*

20 gm. thiosalicylic acid were suspended in 180 ml. ethylene chloride and the resulting suspension was admixed with 14 gm. isopropylisocyanate. The mixture was heated for a short period of time on a waterbath, whereby a clear solution was formed which was admixed with 40 ml. thionyl chloride. The mixture was then heated under reflux for 2 hours. Thereafter the reaction mixture was evaporated to dryness and the residue was recrystallized from methanol. The recrystallized product had the structural formula

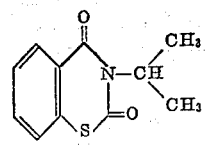

and a melting point of 67° C. The yield was 15 gm.
Calculated: C 59.75%; H 4.98%. Found: C 59.55%; H 4.93%.

EXAMPLE 14

(a) *Sodium salt of benzo-1,3-thiazine-dione-(2,4)*

18 gm. benzo-1,3-thiazine-dione-(2,4) were dissolved in 200 ml. of dioxan, and the resulting solution was admixed with 10 ml. of a 10 N sodium hydroxide at room temperature, accompanied by stirring. The mixture was allowed to stand for 30 minutes, whereupon the precipitate, which had formed, was separated by vacuum filtration. The filter cake was washed with ether and dried. 19 gm. of the readily water-soluble sodium salt of benzo-1,3-thiazine-dione-(2,4) were obtained.

(b) *3-ethyl-benzo-1,3-thiazine-dione-(2,4)*

5 gm. sodium benzo-1,3-thiazine-dione-(2,4) and 10 ml. ethyliodide were dissolved in 40 ml. ethanol and the resulting solution was heated under reflux for 5 hours. The sodium iodide which separated out was filtered off, and the filtrate was evaporated in a vacuum. The evaporation residue was recrystallized from methanol. The crystalline reaction product had the structural formula

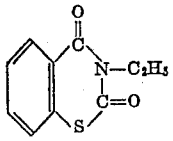

and a melting point of 84° C. The yield was 4 gm.
Calculated: N 6.77%. Found: N 6.49%.

EXAMPLE 15

*3,3'-ethylene-bis-[benzo-1,3-thiazine-dione-(2,4)]*

5 gm. of the sodium salt of benzo-1,3-thiazine-dione-(2,4) were dissolved in 40 ml. ethanol together with 10 ml. ethylene bromide, and the solution was boiled under reflux for 5 hours. The sodium bromide which had separated out was filtered off, and the filtrate was evaporated to dryness. The evaporation residue was recrystallized from ethanol. The purified reaction product had the structural formula

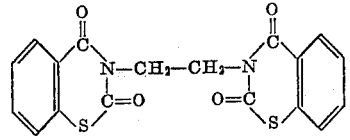

and a melting point of 213° C. The yield was 3.1 gm.
Calculated: N 9.79%. Found: N 9.52%.

EXAMPLE 16

*3,3'-ethylene-bis-[benzo-1,3-thiazine-dione-(2,4)]*

30 gm. thiosalicylic acid together with 54 ml. triethylamine, were dissolved in 100 ml. tetrahydrofuran at 0° C. The resulting solution was then admixed, first with 37 ml. chloroformic acid ethyl ester and then with 6 gm. ethylenediamine. The reaction mixture was allowed to stand for 2 hours, whereupon it was distilled off in a vacuum. The residue was washed with water and recrystallized from ethyl alcohol. The reaction product had the structural formula shown in Example 15 and a melting point of 213° C.

EXAMPLE 17

3-amino-benzo-1,3-thiazine-dione-(2,4)

30 gm. thiosalicylic acid, together with 16 gm. sodium hydroxide were dissolved in a mixture of 50 ml. water and 150 ml. tetrahydrofuran. The solution was then heated to 35° C. and was admixed, first, with 38 ml. chloroformic acid ethyl ester and subsequently with 15 ml. hydrazine hydrate (80%). The reaction mixture was allowed to stand over night whereby 8 gm. of the reaction product having the structural formula shown in Example 3 and a melting point of 203° C. crystallized out in very pure form.

EXAMPLE 18

Benzo-1,3-thiazine-dione-(2,4)

30 gm. thiosalicylic acid, together with 40 gm. potassiumbicarbonate were dissolved in a mixture of 100 ml. water and 100 ml. dioxan. The temperature of the resulting solution was then adjusted to 20° C., whereupon, it was admixed first, with 38 ml. chloroformic acid ethyl ester and then with 50 ml. of a semi-concentrated aqueous solution of ammonia. The reaction mixture was allowed to stand over night, and was then evaporated in a vacuum. The residue was admixed with water, the aqueous mixture was acidified and filtered. The filter cake was crystallized from ethanol. 5 gm. of the compound having the structural formula shown in Example 1 and a melting point of 211° C. were obtained.

EXAMPLE 19

3-phenyl-benzo-1,3-thiazine-dione-(2,4)

30 gm. thiosalicylic acid, together with 28 gm. potassium carbonate were dissolved in a mixture of 50 ml. water and 150 ml. tetrahydrofuran. The temperature of the resulting solution was adjusted to 0° C. whereupon, it was admixed first, with 38 ml. chloroformic acid ethyl ester and then with 19 gm. aniline. The reaction mixture was allowed to stand for about 10 hours, whereupon, 7 gm. of the compound having the structural formula shown in Example 5 crystallized out. The melting point of the reaction product was 146° C.

EXAMPLE 20

Benzo-1,3-thiazine-dione-(2,4)

8.5 gm. potassium cyanate were dissolved in 100 ml. water, and then 15.4 gm. thiosalicyclic acid were suspended in this solution. The suspension was maintained at a temperature of 20–30° C. for 20 minutes, whereby it became clear. Thereafter, the clear solution was acidified with 2 N hydrochloric acid, whereby 17 gm. S-carbamido-thiosalicylic acid having a melting point of 140° C. precipitated out. 10 gm. of the S-carbamido-thiosalicyclic acid were suspended in 50 ml. ethylene chloride and 10 ml. thionyl chloride were added to the suspension. The resulting suspension was heated under reflux for 2 hours. The suspended material went into solution but the crystalline reaction product soon separated out. 6.3 gm. of the compound having the structural formula shown in Example 1, and a melting point of 210° C. were obtained.

5 gm. S-carbamido-thiosalicylic acid were heated for 6 hours at 180° C. Upon cooling the molten material solidified and was recrystallized from methanol. 3.2 gm. of the compound having the structural formula shown in Example 1 and a melting point of 210° C. were obtained.

EXAMPLE 21

3-methyl-benzo-1,3-thiazine-dione-(2,4)

11.5 gm. thiosalicylic acid were dissolved in 80 ml. dioxan, and the resulting solution was admixed with 4.4 gm. methylisocyanate. After the ensuing reaction had subsided, the reaction mixture was allowed to stand for 10 hours at 20° C. The dioxan solvent was evaporated, and 15 ml. thionylchloride were poured over the residue. The resulting mixture was heated for 30 minutes on a water bath. By adding petroleum ether to the mixture, 8.0 gm. of the compound having the structural formula shown in Example 4 and a melting point of 119° C. separated out.

EXAMPLE 22

3-ethyl-benzo-1,3-thiazine-dione-(2,4)

15.4 gm. thiosalicylic acid were dissolved in 50 ml. dioxan, the resulting solution was admixed with 9 ml. ethylisocyanate. The mixture was allowed to stand for 15 hours whereupon, the solvent was evaporated and the residue was washed with petroleum ether. 21 gm. S-(carboethylamido)-thiosalicylic acid were obtained, which were admixed with 80 ml. ethylene chloride and 20 ml. thionyl chloride. The mixture was heated under reflux for 1 hour. The resulting solution was evaporated to dryness and the residue was recrystallized from methanol. 17 gm. of the compound having the structural formula shown in Example 14, and a melting point of 77° C. were obtained.

EXAMPLE 23

3-propyl-benzo-1,3-thiazine-dione-(2,4)

20 gm. thiosalicylic acid were suspended in 180 ml. ethylene chloride and the resulting suspension was admixed with 14 gm. propylisocyanate. The mixture was heated for a short period of time on a water bath, whereby a clear solution was formed which was admixed with 40 ml. thionyl chloride. The mixture was then heated under reflux for 2 hours. Thereafter, the reaction mixture was evaporated to dryness and the residue was recrystallized from methanol. The recrystallized product had the structural formula

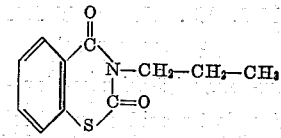

and a melting point of 89° C. The yield was 13 gm.

Calculated: C 59.75%, H 4.98%. Found: C 59.60%, H 5.19%.

EXAMPLE 24

Benzo-1,3-thiazine-dione-(2,4)

60 gm. thiosalicylic acid and 20 gm. cyanamide, together with 120 ml. tetrahydrofuran were refluxed for 1 hour. The reaction mixture was then allowed to cool and was filtered. The filter cake was washed with methanol. 43 gm. of 2-imino-4-oxo-benzo-dihydro-1,3-thiazine having a melting point of 285° C. were obtained. 10 gm. of this product were admixed with 20 ml. of a semi-concentrated aqueous solution of hydrochloric acid and the mixture was heated for 4 hours at about 80° C. The solids in the mixture temporarily went into solution but the reaction product having the structural formula shown in Example 1 crystallized out in the end. The product had a melting point of 209° C. The yield was 8.1 gm.

EXAMPLE 25

Benzo-1,3-thiazine-dione-(2,4)

15.4 gm. thiosalicylic acid and 6 gm. cyanamide were admixed with 150 ml. water and the mixture was refluxed for 4 hours. Thereafter, 70 ml. concentrated hydrochloric acid were added to the reaction mixture and refluxing was continued for an additional 4 hours. Upon cooling, the reaction mixture was filtered on a vacuum filter and the filter cake was washed with methanol. The compound having the structural formula shown in Example 1 and a melting point of 209° C. was obtained with a yield of 9 gm.

EXAMPLE 26

*Benzo-1,3-thiazine-diode-(2,4)*

25 g. calcium cyanamide were suspended in 100 ml. water at 0° C. Thereafter, 22.6 gm. sulfuric acid dissolved in 50 ml. water were stirred into the calcium cyanamide suspension. The resulting mixture was filtered on a vacuum filter to remove calcium sulfate and carbon. The filtrate was admixed with 30 gm. thiosalicylic acid and the mixture was refluxed for 3 hours. At the end of this period, 100 ml. concentrated hydrochloric acid were added thereto, and the resulting mixture was again refluxed for 5 hours. Upon cooling, the reaction mixture was filtered on a vacuum filter and the filter cake was washed with methanol. 25 gm. of the compound having the structural formula shown in Example 1 and a melting point of 204° C. were obtained.

EXAMPLE 27

*3-(β-chloroethyl)-benzo-1,3-thiazine-dione-(2,4)*

13 gm. thiosalicylic acid were suspended in 80 ml. ethylene chloride and the resulting suspension was admixed with 9 gm. β-chloroethyl-isocyanate. The mixture was refluxed for 4 hours, 20 ml. thionyl chloride were added thereto and refluxing was continued for another hour. The reaction mixture was then evaporated to dryness and the residue was recrystallized from methanol. 4 gm. of the compound having the structural formula

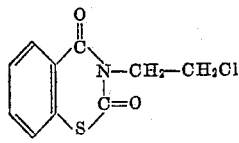

and a melting point of 123° C. were obtained.
Calculated: N 5.80%. Found: N 5.95%.

EXAMPLE 28

*3-ethyl-benzo-1,3-thiazine-dione-(2,4)*

19.5 gm. thiosalicylic acid were dissolved in 50 ml. dioxan. The resulting solution was admixed with 17.6 ml. triethylamine and the mixture was cooled to a temperature between 0 and 5° C. Thereafter, a solution of 15 gm. ethyl-carbamic acid chloride in 100 ml. dioxan was added to the first solution, accompanied by stirring, and the resulting mixture was allowed to stand for 5 hours at room temperature. The triethylamine-hydrochloride formed thereby was filtered off on a vacuum filter and the filtrate was evaporated to dryness. 25 ml. thionyl chloride were poured over the evaporated residue and the resulting mixture was heated for 30 minutes on a water bath. The mixture was again evaporated to dryness, and the residue was recrystallized from methanol. 11 gm. of the compound having the structural formula shown in Example 14 and a melting point of 77° C. were obtained.

EXAMPLE 29

*Benzo-1,3-thiazine-dione-(2,4)*

19.7 gm. S-carbamido-thiosalicylic acid (obtained by the method described in Example 1) were dissolved in a mixture of 100 ml. dioxan and 5 ml. ethanol. Hydrogen chloride gas was passed through this solution for about 1 hour, and the solution was then refluxed for 2 hours. Thereafter, the reaction mixture was evaporated and the residue was recrystallized from methanol. 2.5 gm. of the compound having the structural formula shown in Example 1 and a melting point of 210° C. were obtained.

EXAMPLE 30

*Benzo-1,3-thiazine-dione-(2,4)*

19.7 gm. S-carbamido-thiosalicylic acid (obtained according to the method described in Example 1) were stirred into 1 gm. p-toluene sulfonic acid, and the resulting mixture was melted by heating it for 5 hours at 170° C. in a slight vacuum. Upon cooling, the reaction product was extracted with methanol, and the extraction residue was recrystallized from ethanol. 4.1 gm. of the compound having the structural formula shown in Example 1 and a melting point of 210° C. were obtained.

EXAMPLE 31

*6-bromo-benzo-1,3-thiazine-dione-(2,4)*

11.7 gm. 5-bromo-thiosalicylic acid were suspended in 50 ml. water, and the suspension was admixed with 3.0 gm. cyanamide. The mixture was then heated on a water bath for 2 hours. A coarse-grained precipitate was formed which was filtered off on a vacuum filter. The filter cake was washed with methanol and was admixed with 50 ml. of a semi-concentrated aqueous hydrochloric acid solution. The resulting mixture was refluxed for 4 hours. The precipitate formed thereby was filtered off and was recrystallized from a mixture of methanol and water. The recrystallized product had the structural formula

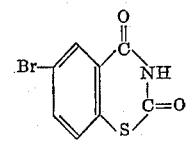

and a melting point of 218° C. The yield was 2.5 gm.
Calculated: N 5.42%. Found: N 5.46%.

EXAMPLE 32

*6-methyl-benzo-1,3-thiazine-dione-(2,4)*

45 gm. 5-methyl thiosalicylic acid, together with 15 gm. cyanamide and 200 ml. water, were heated for 5 hours on a boiling water bath. Thereafter, 50 ml. concentrated hydrochloric acid were added thereto and the resulting mixture was refluxed for 3 hours. The reaction mixture was then filtered on a vacuum filter, and the filter cake was recrystallized from methanol. The recrystallized reaction product had the structural formula

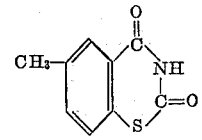

and a melting point of 184° C. The yield was 8.6 gm.
Calculated: C 56.00%; H 3.65%. Found: C 56.05%; H 4.00%.

EXAMPLE 33

*Benzo-1,3-thiazine-dione-(2,4)*

A mixture of 15.4 gm. thiosalicylic acid, 9.7 gm. potassium thiocyanate and 60 ml. water was refluxed for 30 hours. Thereafter, the reaction mixture was filtered on a vacuum filter and the filter cake was recrystallized from methanol. 7 gm. 2-thio-4-oxo-benzo-dihydro-1,3- thiazine having a melting point of 226° C. were obtained. 5 gm. of this substance were thoroughly admixed with 20 gm. mercuric oxide and the mixture was heated for 2 hours at 250° C. Thereafter, the reaction mixture was extracted with and recrystallized from methanol. 2 gm. of the compound having the structural formula shown in Example 1 and a melting point of 209° C. were obtained.

EXAMPLE 34

*3-methyl-benzo-1,3-thiazine-dione-(2,4)*

15.4 gm. thiosalicylic acid were dissolved in 60 ml. dioxan. The resulting solution was admixed with 8.5 ml. methyl-isothiocyanate and the mixture was refluxed for 6 hours. Upon cooling, 10 gm. 3-methyl-2-thio-4-oxo-benzo-dihydro-1,3-thiazine having a melting point of 144° C. crystallized out. 5 gm. of this substance were admixed with 25 gm. mercuric oxide and the resulting mixture was heated for 1 hour at 150° C. The reaction mixture was then extracted with methanol and the extraction residue was recrystallized from a mixture of methanol and water. 3.0 gm. of the compound having the structural formula shown in Example 4 and a melting point of 119° C. were obtained.

EXAMPLE 35

*3-ethyl-benzo-1,3-thiazine-dione-(2,4)*

15.4 gm. thiosalicylic acid were dissolved in 40 ml. dioxan. The solution was then admixed with 8 gm. ethyl-isothiocyanate and refluxed, for 10 hours. Subsequently, the reaction mixture was evaporated to dryness, and the residue was recrystallized from methanol. 7.5 gm. 3-ethyl-2-thio-4-oxo-benzo-dihydro-1,3-thiazine having a melting point of 122° C. were obtained. 2 gm. of this substance were admixed with 20 gm. mercuric oxide and the mixture was heated for 1 hour at 250° C. The resulting product was extracted with ethanol, evaporated to dryness and the residue was recrystallized from a mixture of methanol and water. 0.6 gm. of the compound having the structural formula shown in Example 14, and a melting point of 82° C. was obtained.

EXAMPLE 36

*3-butyl-benzo-1,3-thiazine-dione-(2,4)*

15.4 gm. thiosalicylic acid were dissolved in 70 ml. tetrahydrofuran. 13 gm. butyl-isothiocyanate were added to the solution and the mixture was refluxed for 10 hours. The reaction mixture was evaporated to dryness, and the evaporation residue was recrystallized from methanol. 6.7 gm. 3-butyl-2-thio-4-oxo-benzo-dihydro-1,3-thiazine having a melting point of 71° C. were obtained. 5 gm. of this substance were thoroughly admixed with 30 gm. lead oxide and the mixture was heated for 2 hours at 200° C. Subsequently, the mixture was extracted with and recrystallized from methanol. 1.3 gm. of a compound having the structural formula

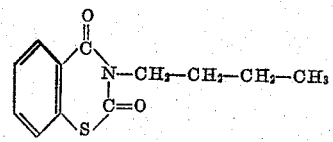

and a melting point of 70° C. were obtained.
Calculated: C 61.25%; H 5.53%. Found: C 61.60%; H 5.54%.

EXAMPLE 37

*3-ethyl-benzo-1,3-thiazine-dione-(2,4)*

7.2 gm. sodium hydroxide were dissolved in 20 ml. water. 11 ml. carbon disulfide and 24.5 ml. of a 33% aqueous ethylamine solution were added to the sodium hydroxide solution and the resulting solution was heated for 1 hour at 70° C. Upon cooling, first, 17.5 ml. chloroformic acid ethyl ester and then 40 ml. water were added, and the mixture was heated for 30 minutes on a water bath. 28 gm. thiosalicylic acid were then added, the mixture was refluxed for 1 hour, and 100 ml. ethanol were added. Upon cooling, 15 gm. 3-ethyl-2-thio-4-oxo-benzo-thiohydro-1,3-thiazine having a melting point of 122° C. crystallized out. This substance was transformed into 3-ethyl-benzo-1,3-thiazine-(2,4) having the structural formula shown in Example 14 by the method described in Example 35.

I claim:
1. Benzo-1,3-thiazine-dione-(2,4).
2. 3-methyl-benzo-1,3-thiazine-dione-(2,4).
3. 3-ethyl-benzo-1,3-thiazine-dione-(2,4).
4. 3-propyl-benzo-1,3-thiazine-dione-(2,4).
5. 3-isopropyl-benzo-1,3-thiazine-dione-(2,4).
6. 3-butyl-benzo-1,3-thiazine-dione-(2,4).
7. 3-(β-chloroethyl)-benzo-1,3-thiazine-dione-(2,4).
8. 3-(p-chlorophenyl)-benzo-1,3-thiazine-dione-(2,4).
9. (β-6-methyl)-benzo-1,3-thiazine-dione-(2,4).
10. Benzo-1,3-thiazine-diones-(2,4) having the structural formula

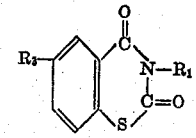

wherein $R_1$ is selected from the group consisting of hydrogen, lower alkyl, monohalo-substituted lower alkyl, benzyl, phenyl, p-methoxy-phenyl, p-halo-phenyl, p-diethyl-amino-phenyl, amino, cyclohexyl and β-[benzo-1,3-thiazine-dione-(2,4)-yl-3]-ethyl, and $R_3$ is selected from the group consisting of hydrogen, halogen and methyl.

11. The method of preparing benzo-1,3-thiazine-diones-(2,4) having the structural formula

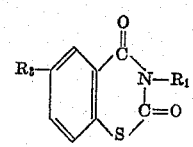

wherein $R_1$ is selected from the group consisting of hydrogen, lower alkyl, monohalo-substituted lower alkyl, benzyl, phenyl, p-methoxy-phenyl, p-halo-phenyl, p-diethyl-amino-phenyl, amino, cyclohexyl and β-[benzo-1,3-thiazine-dione-(2,4)-yl-3]-ethyl, and $R_3$ is selected from the group consisting of hydrogen, halogen and methyl, which comprises reacting a thiosalicylic acid compound having the structural formula

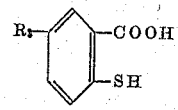

wherein $R_3$ has the meaning defined above with a compound selected from the group consisting of those having the structural formulas HCNO, OCN—$R_1$ and ClCO—NHR$_1$, wherein $R_1$ has the meanings defined above, in the presence of an inert solvent selected from the group consisting of water, benzene, toluene, chloroform, ethyl acetate, ethylene chloride, tetrahydrofuran and dioxane to form a corresponding thiamide of the formula

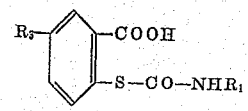

wherein $R_1$ and $R_3$ have the meanings defined above, and cyclizing said thioamides by heating them in the presence of a dehydrating agent, selected from the group consisting of thionyl chloride, phosphorus oxychloride, phosphorus trichloride and phosphorus pentachloride, to form said benzo-1,3-thiazine-diones-(2,4).

References Cited in the file of this patent
UNITED STATES PATENTS

| | | |
|---|---|---|
| 2,364,347 | Dickey | Dec. 5, 1944 |
| 2,476,559 | Nawiasky et al. | July 19, 1949 |
| 2,490,392 | Whetstone | Dec. 6, 1949 |
| 2,714,105 | Wright | July 26, 1955 |
| 2,776,281 | Wright | Jan. 1, 1957 |

OTHER REFERENCES

Einhorn et al., Berichte Deut. Chem. Gesell., vol. 35, pp. 3647–56 (1902).

Conant, The Chemistry of Org. Compounds, page 264 (Revised Ed.) The Macmillan Co., N.Y. (1939).

Lowy et al., Introduction to Organic Chem., page 213, John Wiley & Sons, N.Y. (6th Ed., 1945).

UNITED STATES PATENT OFFICE
Certificate of Correction

Patent No. 2,978,448  
April 4, 1961

Klaus Hasspacher

It is hereby certified that error appears in the above numbered patent requiring correction and that the said Letters Patent should read as corrected below.

Column 2, lines 1 to 7, the left-hand portion of the formula should appear as shown below instead of as in the patent:

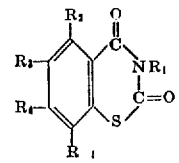

same column 2, lines 26 to 32, the formula should appear as shown below instead of as in the patent:

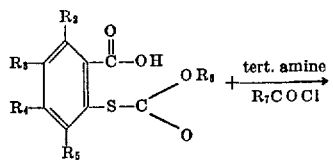

column 5, lines 41 to 47, the formulas should appear as shown below instead of as in the patent:

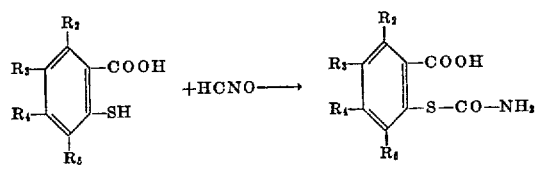

column 5, lines 59 to 64, the formula should appear as shown below instead of as in the patent:

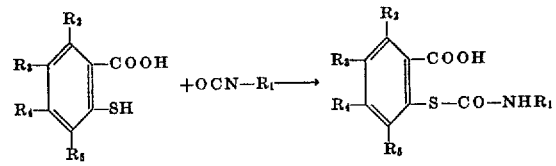

column 6, lines 60 and 61, for "thiosalicyclic" read —thiosalicylic—; same column 6, lines 66 to 73, the right-hand portion of the formula should appear as shown below instead of as in the patent:

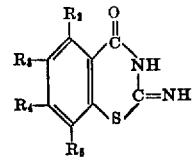

column 7, lines 23 to 29, the right-hand portion of the formula should appear as shown below instead of as in the patent:

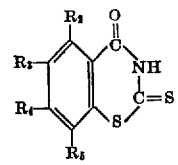

same column 7, lines 31 to 38, the right-hand portion of the formula should appear as shown below instead of as in the patent:

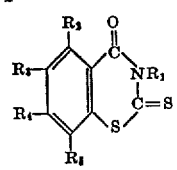

same column 7, line 53, for "intermediate" read —intermediates—; column 9, lines 6 to 12, the formula should appear as shown below instead of as in the patent:

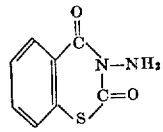

column 11, lines 14 to 16, for that portion of the formula reading

same column 11, line 52, for "ditsillation" read —distillation—; column 15, line 2, in the title of EXAMPLE 26, for "-*diode-*" read —-*dione-*—; line 36, for "5.95%" read —5.94%—; column 18, line 1, for "(β-6-methyl)-" read — 6-methyl- —.

Signed and sealed this 17th day of October 1961.

[SEAL]

Attest:
ERNEST W. SWIDER,
*Attesting Officer.*

DAVID L. LADD,
*Commissioner of Patents.*